Figure 1:
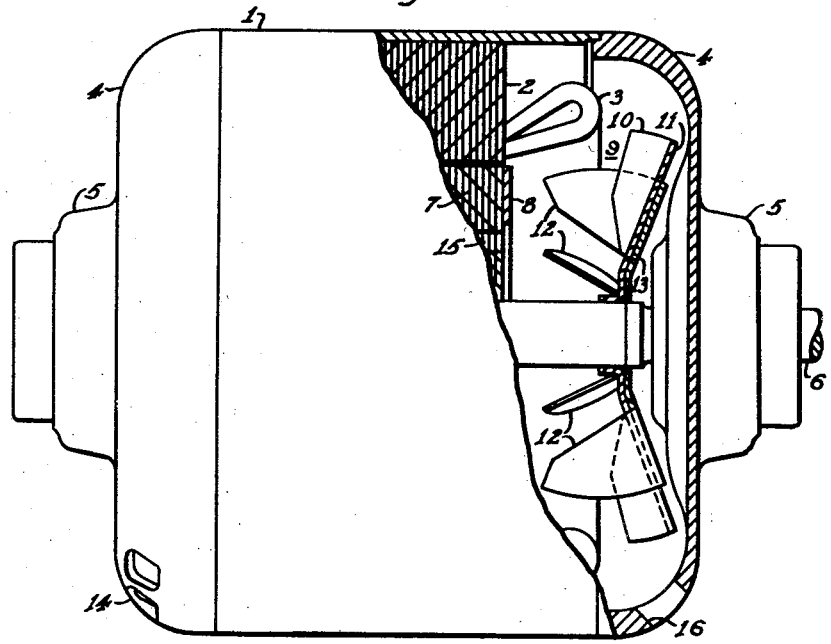

May 16, 1950     T. E. M. CARVILLE     2,508,144

VENTILATION OF DYNAMOELECTRIC MACHINES

Filed Dec. 27, 1947

WITNESSES:

INVENTOR
Theodore E.M. Carville.
BY
ATTORNEY

Patented May 16, 1950

2,508,144

UNITED STATES PATENT OFFICE 2,508,144

VENTILATION OF DYNAMOELECTRIC MACHINES

Theodore E. M. Carville, Lima, Ohio, assignor to Westinghouse Electric Corporation, East Pittsburgh, Pa., a corporation of Pennsylvania Application December 27, 1947, Serial No. 794,195

3 Claims. (Cl. 171—252)

1

The present invention relates to the ventilation of dynamo-electric machines and, more particularly, to a dynamo-electric machine having an internal ventilating fan of novel construction.

The principal object of the invention is to improve the ventilation of dynamo-electric machines, so as to permit a material increase in the rating of a machine of given physical size, without exceeding the permissible temperature rise, or to permit the use of a smaller machine for a given rating.

Another object of the invention is to provide a dynamo-electric machine which utilizes an internal ventilating fan of novel and improved construction in order to obtain an increased flow of ventilating air through the machine, so as to make it possible to increase the rating of a machine of given size without exceeding the permissible temperature rise.

A more specific object of the invention is to provide a dynamo-electric machine which has an internal ventilating fan having a set of generally radial fan blades of greater outside diameter than the inner diameter of the stator core and a second set of generally axial fan blades of smaller outside diameter which extend in under the end turns of the stator winding so as to be close to the rotor.

The invention is particularly adapted for alternating-current induction motors of relatively small size, although its usefulness is obviously not restricted to this particular type of machine. Ventilating fans which have previously been used in motors of this type have generally had a single set of radial blades which had to be made of greater outside diameter than the inner diameter of the stator core in order to obtain a fan of sufficient size and number of blades to produce an adequate flow of air through the machine and to have the necessary spacing between the blades of the fan for reasonable efficiency. A fan of this size was necessarily mounted beyond the end of the end turns of the stator winding, between the stator winding and the end bracket, so that it was at a considerable distance from the rotor. In accordance with the present invention, a second set of axially extending blades is added to a fan of this general type, the second set of blades being of smaller diameter and preferably fewer in number than the first set. The axially extending blades, being of smaller diameter, can be made to extend inside the end turns of the stator winding into close proximity to the rotor, and thus they are very effective in drawing air through the rotor ventilating passages and

2 air gap. In this way, a material improvement in ventilation is effected, and a substantial increase in the rating of a given machine can be obtained.

Figure 2:
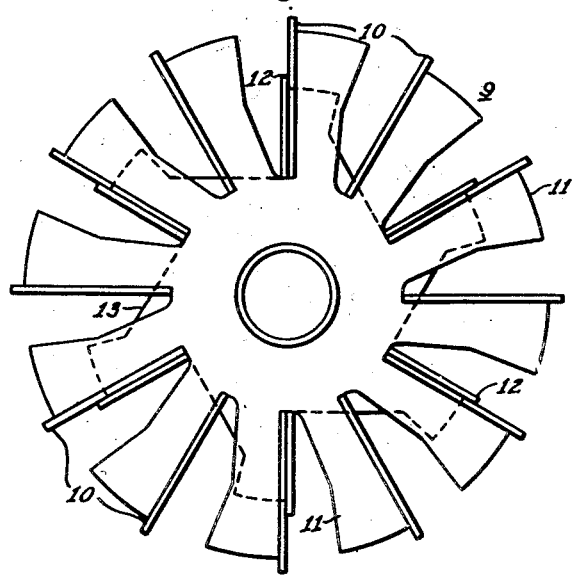

Other objects and advantages of the invention will be apparent from the following detailed description, taken in connection with the accompanying drawing, in which:

Figure 1 is a view, partly in side elevation and partly in longitudinal section, of an electric motor embodying the invention; and Fig. 2 is a view in elevation of the new fan.

The drawing shows the invention embodied in an alternating-current induction motor having a frame member 1 in which is supported an annular laminated stator core 2. A primary or stator winding 3 of any suitable type is placed in slots in the stator core 2 with the end turns of the winding extending axially beyond the core in the usual manner. The frame 1 is closed at its ends by end brackets 4 which have bearing bosses 5 in which are mounted bearings for the shaft 6. A laminated rotor core 7 of any suitable construction is secured on the shaft 6 and carries a secondary or rotor winding 8, which has been shown as a squirrel-cage winding. It will be understood that, although a specific type of motor has been described, the invention is generally applicable to machines of other construction and is not restricted to the particular machine shown for the purpose of illustration.

The motor is ventilated by means of a fan 9 mounted on the shaft 6 at one end of the machine inside the end bracket 4. The fan 9 has a set of generally radially extending blades 10, which may be formed by bending them up from a sheet metal disc 11 which is pressed or otherwise secured on the shaft 6, or the blades 10 may be supported on the shaft in any other suitable manner. The outer diameter of the fan blades 10 is greater than the inner diameter of the stator core 2, as clearly shown in Fig. 1, and the fan is, therefore, necessarily mounted on the shaft 6 with the blades 10 positioned between the outer extremity of the end turns of the winding 3 and the bracket 4, so that these blades are at some distance from the rotor 7.

In order to improve the ventilation of the machine in accordance with the present invention, the fan 9 is also provided with a second set of fan blades 12 which extend generally axially. The fan blades 12 may be formed by bending them up from a sheet metal disc 13, as shown in the drawing, which is secured to the disc 11 by spot welding, or in any other suitable manner. Preferably, the second set of fan blades 12 comprises a smaller number of blades than the first set of fan blades 10, and in the preferred embodiment shown in the drawing, there are half as many blades 12 as blades 10, the sheet metal disc 13 being secured to the disc 11 so that the blades 12 are associated with alternate blades 10. It will be apparent that the fan 9 could also be constructed in other ways, although it has been found that the construction shown is easy and economical to produce.

The second set of fan blades 12 is of smaller outside diameter than the first set of blades 10, and is preferably of subtantially the same diameter as the inner diameter of the stator core 2, or of smaller diameter. As shown in Fig. 1, this relatively small diameter of the axially extending blades 12 permits them to extend inside the end turns of the stator winding 3 so that they come close to the rotor 7. When the motor is running, the fan 9 forces air to flow through the motor, the air entering through ventilating openings 14 in the end bracket 4 at the opposite end of the machine. Because of the location of the axially extending fan blades 12 close to the rotor, they are very effective in causing air to flow through the ventilating passages 15 in the rotor and through the air gap, so that a considerably increased flow of air is obtained as compared to the flow that would be caused by the blades 10 alone. The blades 12 draw this air through the rotor and air gap and direct most of it against the end turns of the winding 3 to cool them. This air, after passing over the winding 3, is then taken by the radial fan blades 10 of larger diameter and forced out through openings 16 in the end bracket 4 at the fan end of the machine. It will be seen, therefore, that the addition of the axially extending fan blades 12 effects a material improvement in the ventilation of the machine over that which would be obtained by a fan of conventional construction, since the position of the fan blades 12 is such that a greater volume of cooling air is forced through the machine, thus obtaining more effective ventilation. By this means, it is possible to substantially increase the rating of a machine of given size without making any changes other than the use of the new fan. Similarly, the use of this fan makes it possible to reduce the size of the machine for a given rating.

A specific embodiment of the invention has been shown and described for the purpose of illustration, but it will be apparent that various other embodiments and modifications are possible. Thus, the ventilating fan 9 has been shown as having half as many axially extending blades 12 as radially extending blades 10 and, in general, it is desirable to utilize fewer axial blades than radial blades because of their relatively smaller diameter, so as to permit the air to move freely through the fan instead of being chopped up, as it would be if the blades were too close together. Any suitable or desired number of blades may be used, however, and any desired construction may be utilized for the fan. It is to be understood, therefore, that the invention is not limited to the specific details of construction shown, but in its broadest aspects it includes all equivalent embodiments and modifications which come within the scope of the appended claims.

I claim as my invention:

1. A dynamo-electric machine having a stator member and a rotor member, said stator member including an annular stator core and a winding on the stator core, said winding having end portions extending axially beyond the stator core, and a fan member mounted for rotation with the rotor member, said fan member having a first set of fan blades of greater outside diameter than the inside diameter of the stator core, the fan member being positioned axially so that said first set of fan blades is beyond the end portions of the winding, and the fan member having a second set of fan blades of smaller outside diameter than the first set of fan blades, said second set of fan blades extending axially inside the end portions of the stator winding.

2. A dynamo-electric machine having a stator member and a rotor member, said stator member including an annular stator core and a winding on the stator core, said winding having end portions extending axially beyond the stator core, and a fan member mounted for rotation with the rotor member, said fan member having a first set of fan blades of greater outside diameter than the inside diameter of the stator core, the fan member being positioned axially so that said first set of fan blades is beyond the end portions of the winding, and the fan member having a second set of fan blades of smaller outside diameter than the first set of fan blades, said second set of fan blades comprising a smaller number of blades than the first set, and the second set of fan blades extending axially inside the end portions of the stator winding.

3. A dynamo-electric machine having a stator member and a rotor member, said stator member including an annular stator core and a winding on the stator core, said winding having end portions extending axially beyond the stator core, and a fan member mounted for rotation with the rotor member, said fan member having a first set of fan blades of greater outside diameter than the inside diameter of the stator core, the fan member being positioned axially so that said first set of fan blades is beyond the end portions of the winding, and the fan member having a second set of fan blades of smaller outside diameter than the first set of fan blades, the blades of said second set of fan blades being associated with alternate blades of the first set and extending axially inside the end portions of the stator winding.

THEODORE E. M. CARVILLE.

REFERENCES CITED

The following references are of record in the file of this patent:

UNITED STATES PATENTS

| Number | Name | Date |
|---|---|---|
| 1,269,537 | Holcombe | June 11, 1918 |

FOREIGN PATENTS

| Number | Country | Date |
|---|---|---|
| 610,507 | Germany | Mar. 12, 1935 |